United States Patent [19]

Derzon et al.

[11] Patent Number: 5,691,080

[45] Date of Patent: Nov. 25, 1997

[54] METHOD OF PREPARING THIN FILM POLYMERIC GEL ELECTROLYTES

[75] Inventors: Dora K. Derzon; Charles Arnold, Jr., both of Albuquerque, N. Mex.

[73] Assignee: Sandia Corporation, Albuquerque, N. Mex.

[21] Appl. No.: 645,172

[22] Filed: Jul. 16, 1996

Related U.S. Application Data

[62] Division of Ser. No. 568,029, Dec. 6, 1995, Pat. No. 5,589,295.

[51] Int. Cl.$^6$ ................................................. H01M 10/38
[52] U.S. Cl. ............................................ 429/190; 429/197
[58] Field of Search ................................. 429/190, 197, 429/192, 194

[56] References Cited

U.S. PATENT DOCUMENTS 5,470,677   11/1995   Williams et al. ........................ 429/190

*Primary Examiner*—John S. Maples
*Attorney, Agent, or Firm*—Timothy D. Stanley; Kurt C. Olsen; Donald A. Nissen

[57] ABSTRACT

Novel hybrid thin film electrolyte, based on an organonitrile solvent system, which are compositionally stable, environmentally safe, can be produced efficiently in large quantity and which, because of their high conductivities $\approx 10^{-3}$ $\Omega^{-1}$ $cm^{-1}$ are useful as electrolytes for rechargeable lithium batteries.

10 Claims, 1 Drawing Sheet

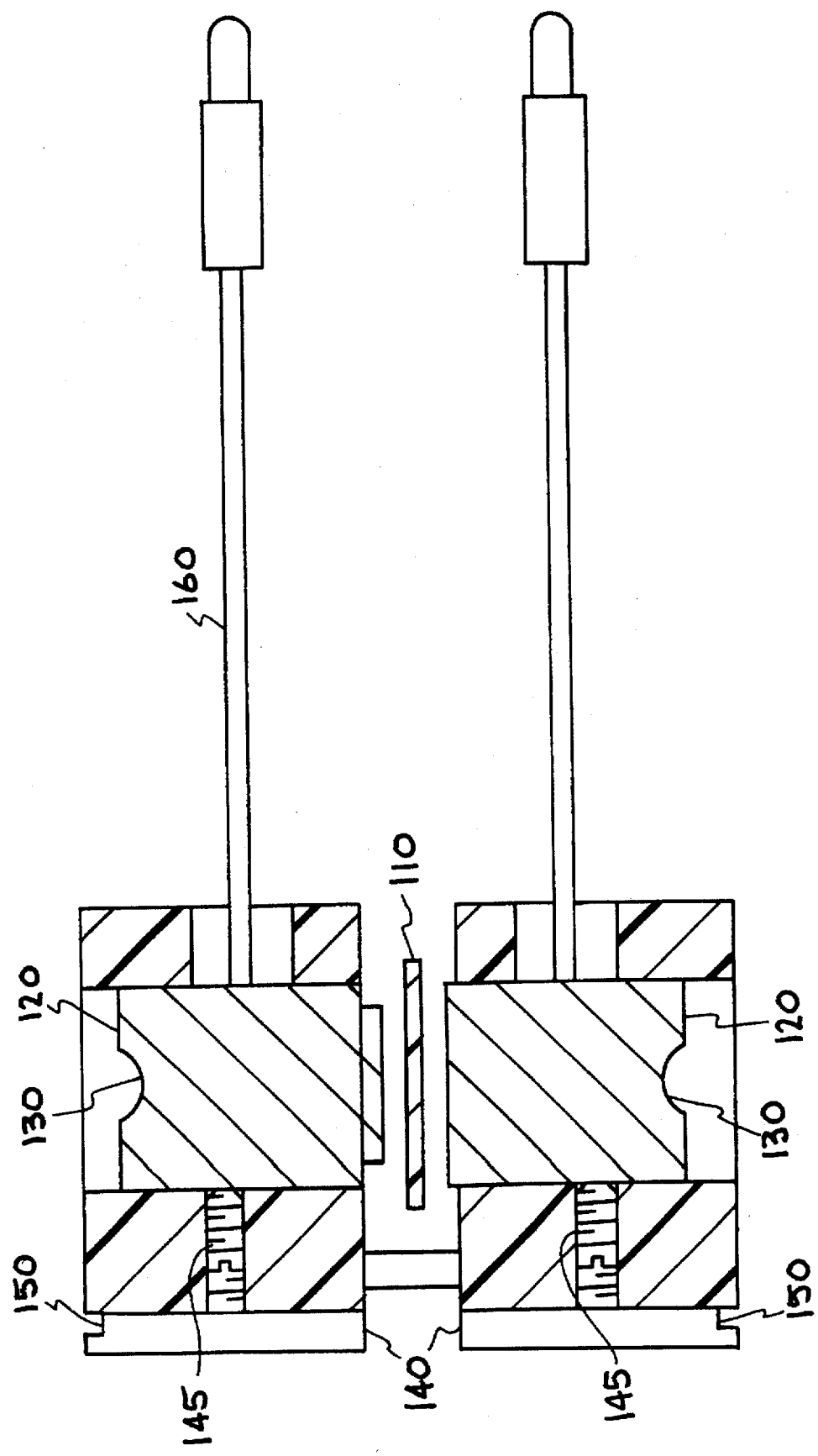

METHOD OF PREPARING THIN FILM POLYMERIC GEL ELECTROLYTES

This application is a division of application Ser. No. 08/568,029, filed Dec. 6, 1995, now U.S. Pat. No. 5,589,295.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to electrolytes and particularly to hybrid thin film polymer electrolytes for lithium rechargeable batteries.

Lithium-based rechargeable batteries offer significant advantages over other rechargeable electrochemical systems in terms of improved performance characteristics such as increased power and energy density and cycle life, particularly for consumer applications such as computers, power tools, etc. For this reason, a significant amount of research is aimed at improving the characteristics of rechargeable lithium batteries. Of particular interest, is the development of improved electrolytes.

Aprotic liquid electrolytes used in lithium rechargeable batteries possess the high conductivities necessary for high energy and power density applications, however, they suffer from several significant disadvantages. Batteries having liquid electrolytes are prone to leak and consequently, present a safety problem; they suffer from anode passivation which reduces output and life; and because they cannot be produced by continuous processes, manufacturing is inefficient. Solid electrolytes overcome most of these disadvantages except that they have low conductivities at normal operating temperatures ($\leq 10^{-5}$ ohm$^{-1}$ cm$^{-1}$), limiting the current that can be withdrawn from the battery.

Hybrid thin film electrolytes, which are basically liquid electrolytes in which the liquid phase has been immobilized by incorporation into a polymer, combine the best features of both liquid and solid electrolytes; retaining the high conductivity of liquid electrolytes and the electrolyte immobility of solid electrolytes while overcoming the disadvantages of both liquid and solid electrolytes. Because of their attractive features these electrolytes have been studied extensively and demonstration batteries incorporating hybrid thin film electrolytes have been built. However, the ambient temperature conductivities have generally been too low to be useful for most battery applications. Prior attempts to fabricate hybrid thin film electrolytes and the use of these electrolytes in batteries has been summarized in K. M. Abraham, *Ambient Temperature Polymer Electrolyte Batteries*, Fourth Annual International Rechargeable Battery Seminar, Deerfield Beach, Fla., Mar. 3, 1992 and B. Barnett and D. Fauteux, *New Directions in Polymer Electrolyte Battery Technology*, ibid.

In these hybrid thin film electrolytes, the immobilizing polymer phase comprises two basic forms; chemically crosslinked polymers and polymers that can form a physical network, i.e., capable of forming a gel based on physical interactions among their linear chains. The electrolyte, contained within the polymer phase, generally comprises a lithium salt and an aprotic solvent or mixture of solvents capable of dissolving the lithium salt. Because of their good mechanical properties, these hybrid electrolytes can be cast as thin films that allow ions to move through them when a potential is applied between the electrodes on which the film is deposited.

It is well known to those skilled in the electrochemical art that the ionic conductivity of an electrolyte is strongly dependent upon the concentration of the solute. Consequently, it is advantageous to raise the concentration of the solute in the electrolyte until an optimum concentration is reached, typically that concentration of solute at which the solution exhibits a maximum conductivity. Propylene carbonate has been used as a solvent for lithium salts because of its high dielectric constant. As shown by Abraham et al. (J. Electrochem. Soc., 137, 1657–1658, May 1990), the conductivities of hybrid thin film electrolytes having a propylene carbonate solvent can be as high as $10^{-3}$ ohm$^{-1}$ cm$^{-1}$. However, propylene carbonate has a high vapor pressure relative to other high dielectric constant organic solvents, such as succinonitrile, which makes propylene carbonate less desirable for use in battery applications. Studies of the conductivity of hybrid electrolytes have generally employed LiClO$_4$ as a solute, e.g., Watanabe et al. (J. Polymer Science, 21, 939–948, 1983). However, because it is a strong oxidizing agent, LiClO$_4$ is unacceptable as a solute for battery applications for safety reasons. What is needed is a hybrid thin film electrolyte, useful for lithium rechargeable batteries, having a conductivity $\approx 10^{-3}$ ohm$^{-1}$ cm$^{-1}$, and in which the liquid phase contained therein comprises a good solvent for lithium salts, has a low vapor pressure at operating temperatures that would be experienced by rechargeable lithium batteries and a lithium containing solute which does not present safety hazards.

Responsive to these needs, the instant invention discloses novel hybrid electrolyte thin films which are compositionally stable, environmentally safe, can be efficiently produced in large quantities and which, because of their high conductivities $\approx 10^{-3}$ ohm$^{-1}$ cm$^{-1}$ are useful as electrolytes for rechargeable lithium batteries.

SUMMARY OF THE INVENTION

The hybrid thin film electrolytes of the instant invention comprise a polymer gel that contains within the polymer gel structure a solution comprising ethylene carbonate, an organonitrile and at least one lithium salt having a polarizable anion. These hybrid film electrolytes can be made by dissolving lithium salts and a gel forming polymer in an excess of ethylene carbonate and an organonitrile solvent or a combination of organonitrile solvents to form a solution. The solution is spread into a thin layer, typically by casting onto a plate, such that when part of the solvent is removed by evaporation or other means the polymer is caused to form a clear gel film. In order for the conductivity of the polymer film to be adequate for use as an electrolyte in a lithium rechargeable battery, it is desired that the film retain some of the solution. The hybrid thin film electrolytes made by the method of the present invention can have conductivities from about $9 \times 10^{-4}$ to $3 \times 10^{-3}$ ohm$^{-1}$ cm$^{-1}$ and thickness of less than 0.5 mm.

BRIEF DESCRIPTION OF THE DRAWINGS

FIG. 1 shows the configuration of the cell used to measure conductivities of the hybrid thin film electrolytes.

DETAILED DESCRIPTION OF THE INVENTION

The hybrid thin film electrolytes of the present invention are basically liquid electrolytes in which the liquid phase has been immobilized by incorporation into a polymer gel. The electrolyte, contained within the polymer gel phase, comprises a lithium salt and a mixture of ethylene carbonate and an organonitrile or mixture of organonitriles capable of dissolving the lithium salt.

Hybrid thin film electrolytes of the instant invention, which can range in thickness from 0.1–0.3 mm in thickness, can be made by dissolving lithium salts, having polarizable anions, in an excess of solvent comprising a mixture of ethylene carbonate and an organonitrile or a mixture of organonitriles at elevated temperatures ($\approx 110C$), to form a first solution. An amount of a polymer sufficient to form a solid matrix is dissolved in the first solution, thereby forming a second solution and the second solution is cast onto a plate. By removing part of the solvent from the second solution by evaporation or other means, a clear film can be formed. It will be appreciated by those skilled in the art that some minimum level of solution be retained by the film in order to attain conductivities in the range desired. For hybrid thin film electrolytes of the present invention, a solvent content of between 70–90 wt % is desirable. The polymer gel structure is also critical for the formation of freestanding films, however, as the concentration of polymer becomes higher the conductivity drops, therefore it is necessary to balance these two competing requirements against each other. It has been found that it is preferable that the polymer concentration be less than about 15 wt. %. Preferred aprotic solvents include organonitriles such as succinonitrile, malononitrile and glutaronitrile either alone or in combination. The preferred polymers are polyacrylonitrile (PAN) and poly(vinylidene fluoride) (PVF2). The preferred lithium salts are lithium trifluoromethylsulfonate and lithium bis(trifluromethylsulfonyl)imide either alone or in combination. A detailed procedure useful for preparing the hybrid thin film electrolytes disclosed in the instant invention is given below.

In an inert atmosphere, a mixture of 2.5 g of succinonitrile and 2.5 g of ethylene carbonate was heated to 120C in a 10 ml screw cap vial using a temperature controlled aluminum heating block. To this hot mixture was added 0.55 g of lithium trifluoromethylsulfonate. After the salt has completely dissolved, usually in a matter of few minutes, 0.5 g of polyacrylonitrile (PAN) was added in small increments. When the addition of PAN was complete, the vial was sealed to prevent loss of the ethylene carbonate—succinonitrile solvent during the time the PAN went slowly into solution ($\approx 48$ hrs). After dissolution of the PAN was complete, the resulting hot viscous solution was cast onto a glass plate. Partial removal of the excess solvent, in order to initiate gelation, was accomplished in either of two ways:

1) heating at 125C at $\approx 20$ Torr in a Hüchi oven for times ranging from 5 to 31 minutes.
2) allowing the casting to stand at room temperature in an inert atmosphere.

The second method of solvent removal is preferred because it allows more careful control over the gelation process. However, any suitable combination of temperature and/or vacuum, such as would be obvious to one skilled in the art, can be employed to reduce the solvent concentration and initiate gelation. Following completion of the gelation process, the hybrid thin film electrolyte was removed from the glass casting plate. Hybrid thin films were stored in closed containers to prevent solvent loss.

Because ionic conductivity is a process whereby ions diffuse across the hybrid thin film electrolyte under the influence of an applied potential gradient, those skilled in the art will appreciate that variations in such parameters as film thickness, degree of gelation, solvent content, solute content, proportions of the various ingredients, etc., can have an effect on the conductivity of the hybrid thin film electrolytes prepared in the manner set forth in the instant invention. Consequently, measurements were done to determine the effect of these various processing parameters on the conductivity.

FIG. 1 shows the apparatus used to measure the conductivity of hybrid thin film electrolytes in an inert atmosphere. The hybrid thin film electrolyte 110 is placed between two polished nickel electrodes 120 having an area of 0.785 cm<2>. Nickel electrodes 120 are held rigidly in a plastic holder 140 by a series of set screws 145 placed at 120° from each other. The thickness of the hybrid thin film electrolyte was determined by measuring the distance between the distal ends of the electrodes with a micrometer both before and after the hybrid thin film electrolyte was placed therebetween. As an aid to reproducibility of the measurements, notch 130 was machined onto the distal ends of each electrode. In this way, the thickness measurements were made at the same location for each hybrid thin film electrolyte.

The complex impedance of each hybrid thin film electrolyte was measured over the frequency range of 15–60,000 Hz by an AC impedance measuring system consisting of a Solartron 1255 Frequency Response Analyzer and an EG&G Princeton Applied Research Model 273 Potentiostat/Galvanostat which was connected to nickel electrodes 120 by leads 160. These data were plotted as reactance vs. resistance and the reactance values were extrapolated to zero in order to obtain the bulk resistance of the hybrid thin film electrolyte. The conductivity of the hybrid thin film electrolyte was calculated from the formula $$\sigma = t/R*A$$

where $\sigma$=conductivity (ohm$^{-1}$ cm$^{-1}$)
R=bulk resistance (ohm) at zero reactance
A=area of the sample (cm$^2$)
t=sample thickness (cm)

In Table 1 are shown the effect of lithium trifluoromethylsulfonate concentration and the succinonitrile/ethylene carbonate ratio on the conductivity of a hybrid succinonitrile/ethylene carbonate/PAN/lithium trifluoromethylsulfonate electrolyte. It can be seen that, for given hybrid thin film electrolyte thickness and polymer (PAN) concentration and succinonitrile/ethylene carbonate ratio, the conductivity increases with the concentration of the solute lithium trifluoromethylsulfonate. For a given value of lithium trifluoromethylsulfonate concentration the conductivity values were reasonably independent of the succinonitrile/ethylene carbonate ratio. The values of conductivity ranging from $\approx 5.2 \times 10^{-4}$ ohm$^{-1}$ cm$^{-1}$ at a lithium trifluoromethylsulfonate concentration of about 1.2 wt % to $\approx 1.1 \times 10^{-3}$ ohm$^{-1}$ cm$^{-1}$ at 7 wt % lithium trifluoromethylsulfonate.

In Table 2 the same relationships are shown except that here the solute is lithium bis(trifluromethylsulfonyl)imide. At lower concentrations of lithium bis (trifluromethylsulfonyl)imide ($\approx 1–2$ wt %) the conductivity was approximately the same as that measured for lithium trifluoromethylsulfonate. However, as the concentration of lithium bis(trifluromethylsulfonyl)imide increased the conductivity fell below that of lithium trifluoromethylsulfonate for approximately the same concentration.

Table 3 presents conductivity data for the hybrid thin film electrolyte succinonitrile/ethylene carbonate/PAN/lithium trifluoromethylsulfonate at different temperatures and film thicknesses. As would be expected, the conductivity of this film increased as the themperature increased. Ranging from about $1 \times 10^{-3}$ ohm$^{-1}$ cm$^{-1}$ at ≈25C to about $3 \times 10^{-3}$ ohm$^{-1}$ cm$^{-1}$ at 80C.

From the foregoing description and example, one skilled in the art can readily ascertain the essential characteristics of the present invention. The description and example is intended to be illustrative of the present invention and are not to be construed as limitations or restrictions thereon, the invention being delineated in the following claims.

TABLE 1

Effect of lithium trifluoromethylsulfonate concentration and SN/EC* ratio on the ionic conductivity of SN/EC/PAN/LIT hybrid electrolytes

| Film D | Final Composition (Wt. %) | | | Film Thickness | Film Conductivity |
|---|---|---|---|---|---|
| | Solvents | LIT | PAN | cm | S cm−1 |
| Initial SN/EC Weight ratio, 50/50 | | | | | |
| 17 | 86.7 | 1.2 | 12.1 | 0.02 | 5.16E-04 |
| 18 | 84.3 | 3.7 | 12 | 0.017 | 9.08E-04 |
| 19 | 85.3 | 3.9 | 10.7 | 0.009 | 9.21E-04 |
| 20 | 82.8 | 5.7 | 11.5 | 0.023 | 1.02E-03 |
| 21 | " | " | " | 0.022 | 1.02E-03* |
| 22 | 83.1 | 7 | 9.9 | 0.018 | 1.11E-03 |
| Initial SN/EC Weight Ratio, 10/90 | | | | | |
| 23 | 76.9 | 2.1 | 21 | 0.022 | 4.34E-04 |
| 24 | 78.4 | 5 | 16.6 | 0.018 | 1.09E-03 |
| 25 | 76.4 | 7.9 | 15.7 | 0.021 | 1.05E-03 |
| 26 | 74.7 | 10.5 | 14.8 | 0.024 | 1.34E-03 |

*Repeat evaluation of same cast film (Film ID 20) taken from a different location
*SN/EC - Succinonitrile/Ethylene Carbonate
LiT - Lithium Trifluoromethylsulfonate
PAN - Polyacrylonitrile

TABLE 2

Conductivity and composition data on SN/EC*PAN/LiB electrolytes

| Film D | Final Composition (Wt. %) | | | Film Thickness | Film Conductivity |
|---|---|---|---|---|---|
| | Solvents | LIB | PAN | (cm) | S cm−1 |
| Initial SN/EC Weight Ratio, 50/50 | | | | | |
| 27 | 91.8 | 1.3 | 7 | 0.0152 | 4.57E-04 |
| 28 | 77.4 | 8.3 | 14.5 | 0.0269 | 3.12E-04 |
| Initial SN/EC Weight Ratio, 10/90 | | | | | |
| 29 | 89.1 | 1.7 | 9.2 | 0.022 | 7.06E-04 |

*SN/EC - Succinonitrile/Ethylene Carbonate
LiB - Lithium Bis(trifluoromethylsulfonyl)imide

TABLE 3

Conductivity of a SN/EC*/PAN/LiT electrolyte as a function of temperature Initial SN/EC Weight Ratio, 43/57

| Film ID | Final Composition (Wt. %) | | | Film Thickness | Film Conductivity* | Temperature |
|---|---|---|---|---|---|---|
| | Solvents | LiT | PAN | (cm) | S cm−1 | Deg. C. |
| 30 | 86.4 | 4.5 | 9.1 | 0.0161 | 9.86E-04 | RT |
| 31 | " | " | " | 0.0201 | 1.15E-03 | RT |
| 32 | " | " | " | 0.0168 | 1.08E-03 | RT |
| 33 | " | " | " | 0.0154 | 9.00E-04 | RT |
| 34 | " | " | " | 0.0178 | 1.04E-03 | 22 |
| 35 | " | " | " | 0.0097 | 1.29E-03 | 46 |
| 36 | " | " | " | 0.0076 | 1.56E-03 | 58 |
| 37 | " | " | " | 0.0024 | 3.06E-03 | 80 |

*The average conductivity of two samples evaluated in two fixtures was 1.03E-03 S cm−1 plus/minus 1.09E-04 S cm−1 (10.6%)

We claim:

1. A method of preparing a thin film polymer gel electrolyte comprising the steps of:

a) dissolving a lithium salt and a gel forming polymer in a solvent comprising ethylene carbonate and an organonitrile to form a solution;

b) spreading the solution to form a thin film; and c) removing a portion of the solvent from the film to initiate gelation.

2. The method of claim 1, wherein the solution is heated to about 110C.

3. The method of claim 1, wherein the lithium salt is selected from the group consisting of lithium trifluoromethylsulfonate and lithium bis(trifluromethylsulfonyl)imide, and combinations thereof.

4. The method of claim 1, wherein the concentration of polymer is less that about 15 wt %.

5. The method of claim 1, wherein the polymer is polyacrylonitrile or poly(vinylidenefluoride).

6. The method of claim 1, wherein said step of removing is by heating the spread solution at a reduced pressure.

7. The method of claim 6, wherein the spread solution is heated to a temperature of about 125C at a pressure of about 20 Torr for between about 5 and 30 minutes.

8. The method of claim 1, wherein said step of removing is by allowing the spread solution to stand at room temperature in an inert atmosphere until gelation takes place.

9. The method of claim 1, wherein the concentration of solvent remaining following the step of removing is between about 70 and 90 wt %.

10. A hybrid thin film polymer gel electrolyte for use in lithium rechargeable batteries made by the method of claim 1.

* * * * *